(12) United States Patent
Foo et al.

(10) Patent No.: US 9,849,944 B2
(45) Date of Patent: Dec. 26, 2017

(54) SYSTEM AND METHOD FOR GUIDING CARGO TRANSFER BETWEEN TWO BODIES

(71) Applicant: Keppel Offshore & Marine Technology Centre Pte Ltd, Singapore (SG)

(72) Inventors: Kok Seng Foo, Singapore (SG); Bernard Voon Ee How, Singapore (SG); Xuan Wang, Singapore (SG)

(73) Assignee: KEPPEL OFFSHORE & MARINE TECHNOLOGY CENTRE PTE. LTD., Singapore (SG)

( * ) Notice: Subject to any disclaimer, the term of this patent is extended or adjusted under 35 U.S.C. 154(b) by 0 days.

(21) Appl. No.: 15/282,531

(22) Filed: Sep. 30, 2016

(65) Prior Publication Data
US 2017/0096196 A1    Apr. 6, 2017

(30) Foreign Application Priority Data

Oct. 5, 2015    (SG) ...................... SG10201508253V (51) Int. Cl.
*B63B 27/08*      (2006.01)
*B66C 13/46*      (2006.01)
(Continued)

(52) U.S. Cl.
CPC .............. *B63B 27/30* (2013.01); *B65G 67/62* (2013.01); *B66C 13/46* (2013.01); *B66C 13/063* (2013.01); *B66C 13/48* (2013.01); *B66C 23/52* (2013.01)

(58) Field of Classification Search
CPC . B63B 27/10; B63B 2017/0072; B63B 27/30; B66C 23/52; B66C 23/53;
(Continued)

(56) References Cited

U.S. PATENT DOCUMENTS 3,624,783 A * 11/1971 Chang ..................... B66C 13/02
                                                                     254/275
3,753,552 A * 8/1973 Barron ..................... B66D 1/52
                                                                     137/82

(Continued)

*Primary Examiner* — Gregory Adams
(74) *Attorney, Agent, or Firm* — John P. White; Cooper & Dunham LLP (57) ABSTRACT

A cargo transfer monitoring system at least comprises at least one vessel motion sensor, one pair of wireless modems, a central data processing unit with decision-making module, a rugged display panel as the operator station, and communication coupling. The cargo transfer operation will be carried out by a crane operator sitting in the crane cabin on the primary vessel. The transfer will take place either from target vessel to primary vessel or from primary vessel to target vessel. The sensor(s) collect the real-time motion of vessels, which is carried over to the central computer through data cable or wireless radio link. The decision-making module predicts the motion of the vessels for a subsequent time period. Based on the predicted value, the decision-making module projects the expected or predicted impact force on the payload if the operation is started at the particular time. If the predicted impact force on the payload is below a predetermined threshold, the system recommends the crane operator to resume the landing operation. The system can predict the motion and hence the rope tension for lifting operations and make similar recommendation to resume the lifting operation if the predicted rope tension falls below a predefined threshold.

20 Claims, 6 Drawing Sheets

(51) Int. Cl.
*B63B 27/30* (2006.01)
*B65G 67/62* (2006.01)
*B66C 13/48* (2006.01)
*B66C 13/06* (2006.01)
*B66C 23/52* (2006.01)

(58) Field of Classification Search
CPC ....... B66C 13/02; B66C 13/063; B66C 13/46; B66C 13/48; B65G 67/62; B65G 2814/0397
USPC ............. 414/138.1–138.5, 138.9, 139.6
See application file for complete search history.

(56) References Cited

U.S. PATENT DOCUMENTS

| | | | | |
|---|---|---|---|---|
| 4,132,387 A * | 1/1979 | Somerville | ............. | B66D 1/52 254/340 |
| 4,179,233 A * | 12/1979 | Bromell | ................. | B66C 13/02 212/272 |
| 4,932,541 A * | 6/1990 | Belsterling | ............. | B66C 13/02 212/271 |
| 5,154,561 A * | 10/1992 | Lee | ..................... | B63B 27/12 114/264 |
| 5,894,895 A * | 4/1999 | Welsh | ................... | B66C 13/02 175/40 |
| 5,967,347 A * | 10/1999 | Miyata | ................. | B66C 13/063 212/275 |
| 6,826,452 B1 * | 11/2004 | Holland | ................. | B66C 1/663 318/566 |
| 2003/0123957 A1 * | 7/2003 | Jordan | ................... | B66C 13/02 414/138.2 |
| 2005/0173364 A1 * | 8/2005 | Spohler | ................ | B66C 19/002 212/270 |
| 2012/0296519 A1 * | 11/2012 | Eberharter | ............. | B63B 27/10 701/34.4 |
| 2013/0245817 A1 * | 9/2013 | Schneider | ............. | B66C 13/02 700/228 |

* cited by examiner

SYSTEM AND METHOD FOR GUIDING CARGO TRANSFER BETWEEN TWO BODIES

CROSS REFERENCE TO RELATED APPLICATIONS

This application claims priority of Singaporean Patent Application No. 10201508253V, filed Oct. 5, 2015, the content of which is hereby incorporated by reference into the application.

FIELD OF INVENTION

The invention relates to system and method for guiding load transfer between two bodies, at least one of which is a body in motion.

BACKGROUND

During vessel-to-vessel cargo transfer operations, the side-by-side moored primary vessel and target vessel are moving relative to one another. Normally, the crane operator has to exercise judgment to lift and land the cargo based on experience. A judgment error may result in excessive impact on payload during landing or high rope tension when lifting. This may cause damage to the load or the crane.

When the crane is mounted on a floating vessel, the vertical movement of the floating vessel becomes critical to the crane operation. Some offshore cranes are equipped with active or passive heave compensation module, which compensates for the motion of the crane vessel. The heave compensation module is enabled when the vessel is loading/unloading cargo to onshore or to a fixed platform, or when they are performing subsea installation. However, in the scenario where cargo lifting/landing takes place between two floating bodies in motion, neither passive heave compensation (PHC) nor active heave compensation (AHC) takes into account the motion of the target vessel.

Offshore crane capacity is commonly based on Significant Wave Height. In practice, Significant Wave Height is usually provided by weather stations which uses measurements not collocated with the lifting operation. By considering the real-time motions of both crane and target vessels, the dynamics of the vessels can be more accurately assessed.

For existing vessel motion prediction, the modeling methods require environmental inputs like wave propagation model as well as sea keeping model for the specific vessel. Wave buoys and sensors are placed in the proximity of the vessel to detect the incoming waves. Anemometer is used to detect the wind parameters. The waves and wind parameters make up the environmental input parameters. The environmental input parameters are fed into the sea keeping model with vessel parameters such as hull design and weight distribution.

SUMMARY

The Cargo Transfer Monitoring System (CTMS) according to the invention measures or detects the real-time motion of the target vessel and feedbacks the real-time motions to the primary crane vessel using wireless technology. A computer or data processing unit onboard the primary crane vessel collects the detected motions of both primary vessel and target vessel and predicts the motions of both vessels. Combining the motion prediction with the crane parameters, such as pay in/out speed, load position and weight etc., and vessel parameters, the CTMS is able to calculate the predicted landing impact or lifting rope tension. Using the predicted impact and rope tension, and comparing the predicted value(s) against an operator-defined threshold, the CTMS can recommend the time to start lifting and landing operation such that the predicted impact force or predicted rope tension would be within predefined limits.

The CTMS comprises of an operator station including a display panel, which is provided for the crane operator to visualize the historical and current motions of both vessels. The CTMS provides a lift or land recommendation indicator or signal to the operator for lifting off or landing the payload when the predicted impact or tension is within the predefined limits. The lift or land recommendation indicator is communicated to the operator by showing on the display panel, or by other visual or audio means.

For landing operations, when the operator lowers the payload until the standby distance is reached between the load and target vessel, the display panel indicates to the operator to wait for issuance of a land-recommendation indication or signal before landing the payload. After a land-recommendation has been issued and the payload has landed, the system continues to indicate to the operator to payout the wire until a safe slack length is reached.

According to a first aspect of the invention, a method for guiding load landing during load transfer from a first body to a second body is provided. The method comprises:

successively determining a load-target distance between a load and the second body while the load is descended towards the second body using a crane located at the first body;

if any of the load-target distance is within a predetermined standby distance, generating a pause signal which recommends pausing descent of the load;

determining a predicted subsequent motion of at least one of the first and the second body;

successively determining a predicted impact on the load at landing time based on the predicted subsequent motion; and if any of the predicted impact is within a predetermined load impact limit, generating a resume-landing signal which recommends resuming descent of the load to land the load on the second body.

According to a second aspect of the invention, a system for guiding load transfer from a first body to a second body is provided. The system comprises:

at least one motion sensor located on at least one of the first and the second body, which is a floating vessel, for detecting respective body motion;

a data processing unit comprising:
  at least one motion data acquisition module for receiving the detected motion data from the at least one motion sensor;
  at least one vessel motion prediction module communicably coupled to the at least one motion data acquisition module and configured to determine a predicted subsequent motion of the at least one of the first and the second body based on the detected motion data;
  a computation module communicably coupled to the at least one vessel motion prediction module and configured to:
    successively determine a load-target distance between a load and the second body while the load is descended towards the second body using a crane located at the first body; and
  a logic and recommendation module communicably coupled to the computation module and configured to:

if any of the load-target distance is within a predetermined standby distance, generate a pause signal which is to recommend pausing descent of the load; and wherein the computation module is further configured to: successively determine a predicted impact on the load at landing time based on the predicted subsequent motion; and wherein the logic and recommendation module is further configured to: if any of the predicted impact is within a predetermined load impact limit, generate a resume-landing signal which is to recommend resuming descent of the load to land the load on the second body.

For lifting operations, when the operator retracts the hoisting rope until the standby slack sling length is reached, the system indicates to the operator to wait for issuance of a lift-recommendation indication or signal before lifting the payload. After a lift-recommendation indication has been issued and the payload has been lifted off, the system continues to indicate to the operator to retract the wire until a safe distance from deck is reached.

According to a third aspect of the invention, a method for guiding load lifting during load transfer from a second body to a first body is provided. The method comprises:

successively determining a slack sling length of a sling attaching a load located on the second body to a tip of a crane located on the first body while the hoisting rope is being retracted to reduce slack in the sling;

if any of the slack sling length is within a predetermined standby slack sling length, generating a pause signal which recommends pausing raising of the sling;

determining a predicted subsequent motion of at least one of the first and the second body;

successively determining a predicted rope tension on the crane at lift-off time based on the predicted subsequent motion; and if any of the predicted rope tension is within a predetermined safe rope tension limit, generating a resume-lifting signal which recommends resuming load lifting from the second body.

According to a fourth aspect of the invention, a system for guiding load transfer from a second body to a first body. The system comprises:

at least one motion sensor located on at least one of the first and the second body, which is a floating vessel, for detecting respective body motion;

a data processing unit comprising:
at least one motion data acquisition module for receiving detected motion data from the at least one motion sensor;
at least one vessel motion prediction module communicably coupled to the at least one motion data acquisition module and configured to determine a predicted subsequent motion of the at least one of the first and the second body based on the detected motion data;
a computation module communicably coupled to the at least one vessel motion prediction module, and configured to:
successively determine a slack sling length of a sling attaching a load located on the second body to a tip of a crane located on the first body while hoisting to reduce slack in the sling; and
a logic and recommendation module communicably coupled to the computation module and configured to:

if any of the slack sling length is within a predetermined standby slack sling length, generate a pause signal which recommends pausing raising of the sling; and wherein the computation module is further configured to: successively determine a predicted rope tension on the crane at lift-off time based on the predicted subsequent motion; and wherein the logic and recommendation module is further configured to: if any of the predicted rope tension is within a predetermined safe rope tension limit, generate a resume-lifting signal which recommends resuming load lifting from the second body.

Simulation results show that the maximum impact force and rope tension can be reduced by up to 85%. This force reduction can be achieved without installation of an expensive heave compensated crane system. By providing the real-time measurements of the vessel motions and predicting impact or tension based on the real-time measurements, the system reduces the uncertainty currently faced by crane operators using existing method or system.

The CTMS can also be used for platform to vessel or vessel to platform operations, where one body is fixed and the other floating. The motion will be predicted for the floating body and the expected impact load and rope tension are calculated. If the expected impact load and the rope tension are within predefined threshold, the CTMS can provide a recommendation indication for the operation to commence.

DETAILED DESCRIPTION

In the following description, numerous specific details are set forth in order to provide a thorough understanding of various illustrative embodiments of the invention. It will be understood, however, to one skilled in the art, that embodiments of the invention may be practiced without some or all of these specific details. It is understood that the terminology used herein is for the purpose of describing particular embodiments only, and is not intended to limit the scope of the invention. In the drawings, like reference numerals refer to same or similar functionalities or features throughout the several views.

Possible Application Scenarios

The Cargo Transfer Monitoring System (CTMS) is designed for offshore cargo transfer, where the primary vessel and the target vessel can both be floating bodies, or where one is a fixed body and the other one is a floating body. The following describes the cargo transfer between two floating bodies.

Figure 1:
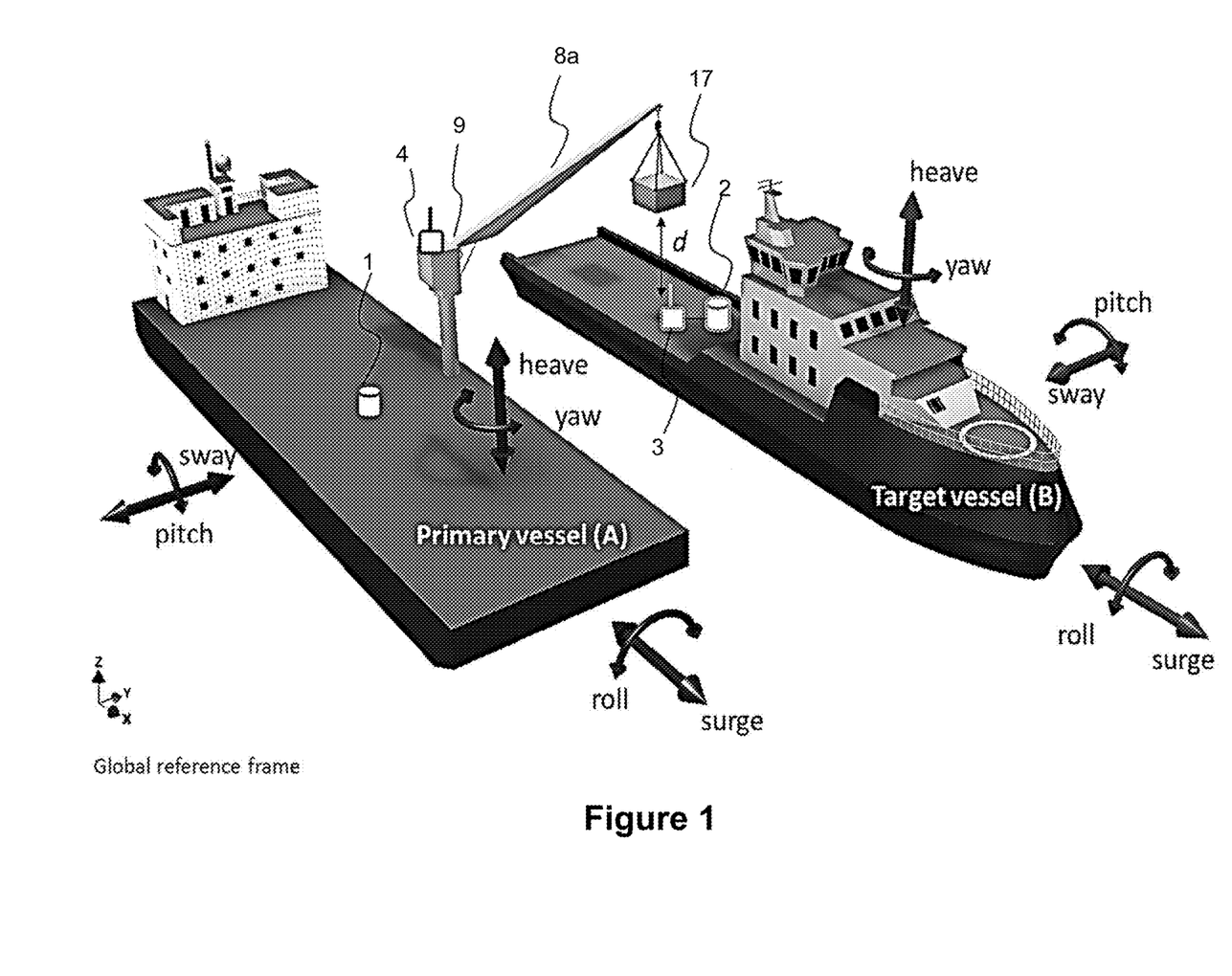
FIG. 1 illustrates a typical scenario where the CTM system of the invention will be installed and used.

FIG. 1 is a perspective illustration of two floating vessels A & B moored side by side, and conducting a vessel to vessel cargo transfer operation. A crane 8a is mounted on primary vessel A and is lowering a payload 17 from a certain distance above the landing area on target vessel B. Vessel motion frames of reference in six degree of freedom, i.e. heave, surge, sway, pitch, roll and yaw, are labeled in FIG. 1. The motion of the payload 17 is affected by primary vessel A when the payload 17 is suspended on its crane sling 19b and follows target vessel B when the payload 17 has landed on the deck 18b of vessel B. The sling 19b is defined as the part of a hoisting rope 19a between the crane tip 8b and the load 17. Operative by the crane 8a, the hoisting rope 19a is paid out to lower the payload 17 or retracted to raise the payload 17. Electronic devices of the CTMS e.g. two motion sensors, wireless transmitter and wireless receiver are included in FIG. 1 to illustrate where they will be installed.

Figure 2A:
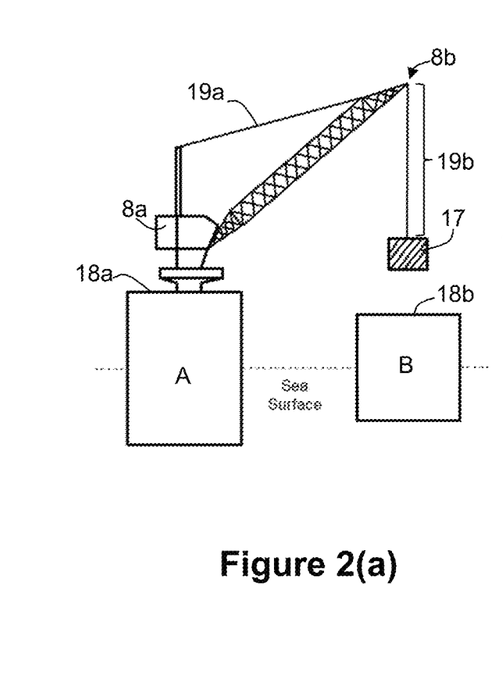
FIG. 2(a) illustrates cargo transfer between two floating vessels.
Figure 2B:
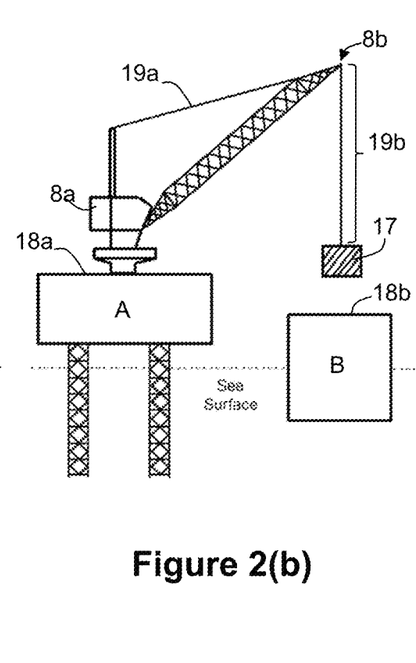
FIG. 2(b) illustrates cargo transfer from fixed platform to floating vessel.
Figure 2C:
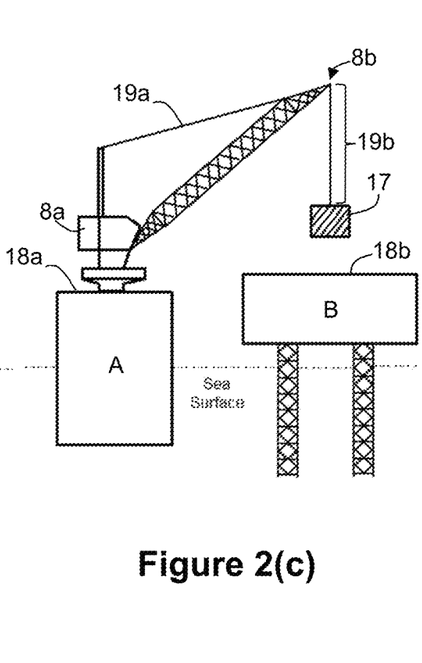
FIG. 2(c) illustrates cargo transfer from floating vessel to fixed platform.

Possible applications of the CTMS are illustrated in FIGS. 2(a), 2(b) and 2(c). Besides vessel to vessel cargo transfer where both vessels are floating and in motion as represented in FIG. 2(a), the system is also applicable to the other two situations represented in FIGS. 2(b) & 2(c) where one of the bodies is a fixed platform and the other one body is a floating vessel. Different from floating vessels which are regarded as bodies in motion or non-static at sea, fixed platforms are regarded as static at sea. Referring to the primary platform A in FIG. 2(b), the crane operator on platform A only needs to consider the payload and the motion of target vessel B. Likewise, in FIG. 2(c), the target platform B is treated as static so the crane operator on primary vessel A needs to consider the motion of vessel A and the payload relative to fixed platform B.

It is to be appreciated that in embodiments where only one of the bodies is a floating vessel and the other is a fixed body, e.g. FIGS. 2(b) & 2(c), only the floating vessel requires motion sensor to detect vessel motion and hence only one motion sensor (to be located at the floating vessel), wireless transmitter and wireless receiver would be required in such embodiments.

The CTMS and Submodules

The invention provides a decision support system including providing a landing or lifting recommendation indicator or signal to the crane operator. Using the recommendation indicator, the crane operator makes a decision to lift or land the payload. This CTMS is not connected to the crane control system and does not actuate the payload in any automated manner.

Specifically, the CTMS collects real-time motion data from the floating vessels, and/or combines them with the crane parameters and measurements to calculate distance and sling length, forecasts the landing and lifting scenario in critical zone, and recommends the optimal time to start and stop the operation. Hence, the CTMS provides the crane operator benefits such as better visualization, real time measured data to base his decision upon and the recommendation to lift or land the load, with reduced impact and rope tension respectively. The operator can combine the proposed recommendation of the system with his experience and other observations to respond to the offshore changing environment promptly and correctly.

Figure 3:
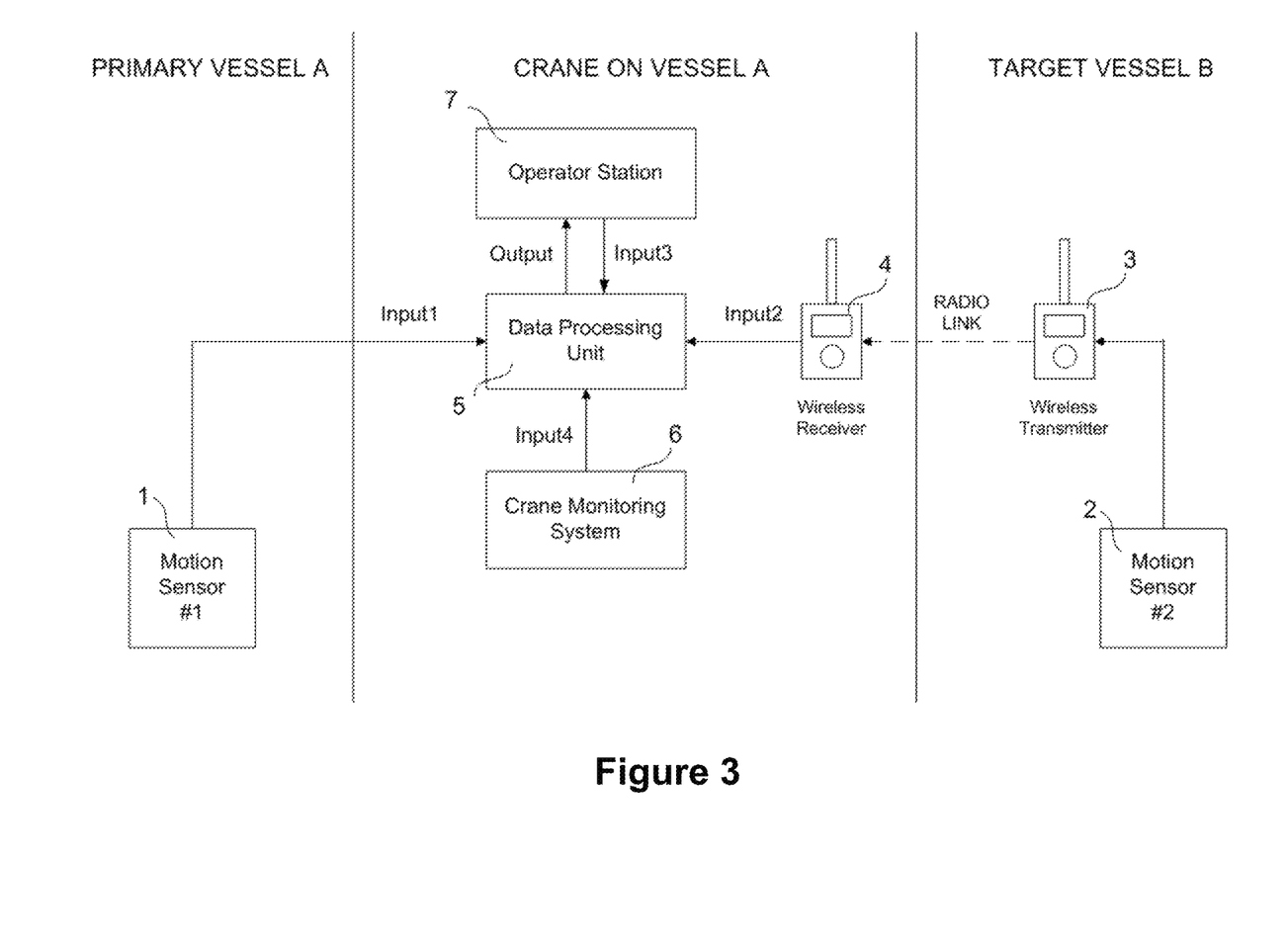
FIG. 3 shows the main electronic components of a system according to one embodiment of the invention.

The CTMS at least comprises two vessel motion sensors (or one motion sensor if only one of the two bodies is a floating vessel and the other body is a fixed body), one pair of wireless modem, a central data processing unit with decision-support software, a rugged display panel as the operator station, and communication coupling. Referring to FIG. 3, one motion sensor 1 is installed on primary vessel A while the other motion sensor 2 is placed on target vessel B. A wireless modem 3 is communicably coupled to motion sensor 2 and used as a wireless transmitter. The other wireless modem 4 is communicably coupled to the data processing unit 5 and used as a wireless receiver. The wireless modem 4 receives the radio signals which carry the motion data of vessel B from the wireless transmitter 3. The crane 8a performing the lifting/landing job is mounted on primary vessel A. Hardware including but not limited to a data processing unit 5, an operator station 7 and the wireless receiver 4 are installed near the crane control cabin 9. In particular, the operator station 7 needs to be properly located in the cabin 9 within the scope and reach of the crane operator. The data processing unit 5 is configured to receive at least four inputs from motion sensor 1, wireless receiver 4, operator station 7 and crane monitoring system 6, respectively and produce at least one output to the operator station 7.

Figure 4:
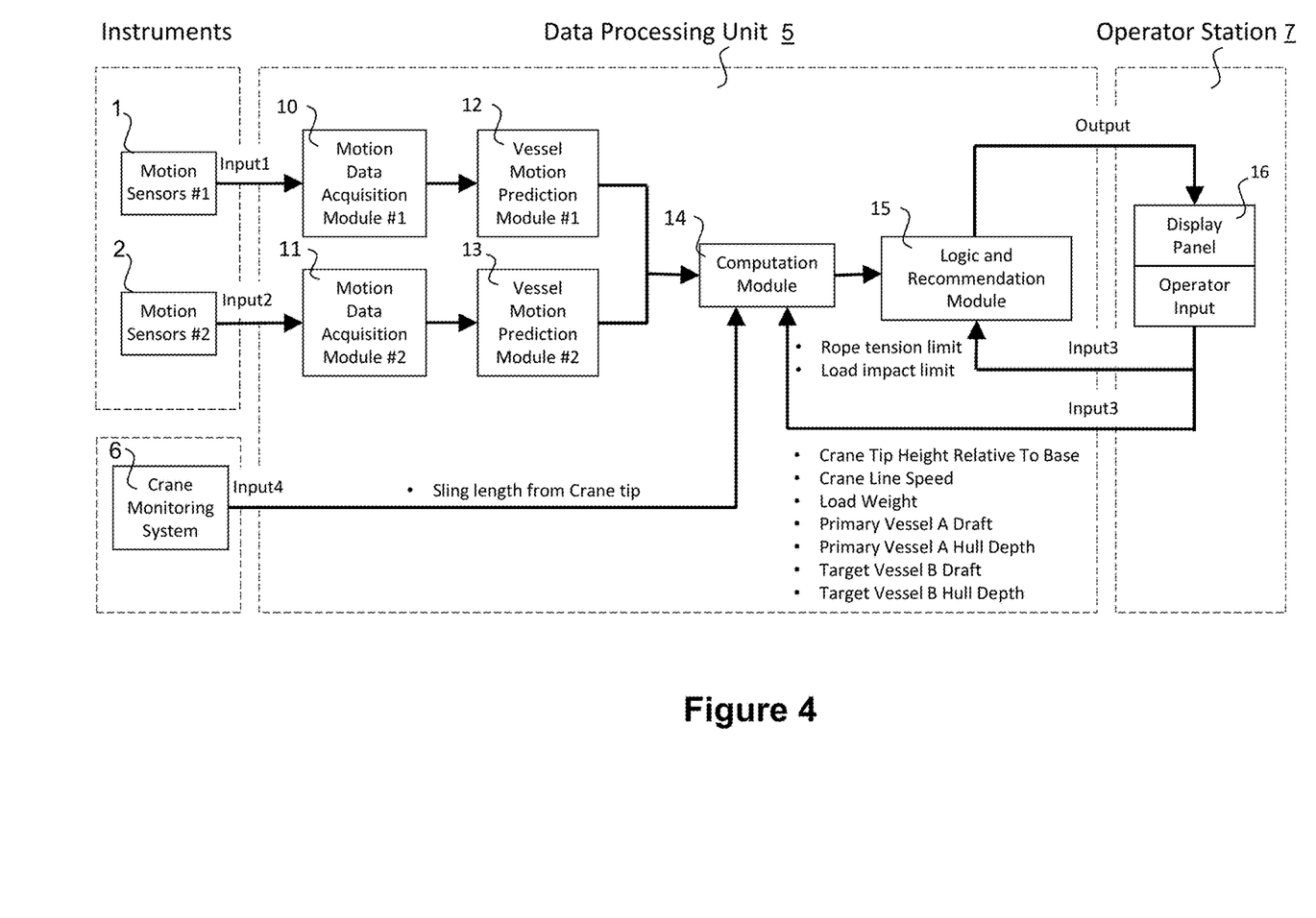
FIG. 4 shows the data flow and software modules of the system according to one embodiment of the invention.

Turning to FIG. 4, the internal modules of data processing unit 5 is elaborated as well as its interfacing with field instruments, operator station and onboard crane monitoring system. Among these modules, motion data acquisition (DAQ) module 10 is configured to acquire the measurement or detected motion data from motion sensor 1 and preliminary filtering of its raw data. Likewise, motion data acquisition (DAQ) module 11 is configured to acquire the measurement or detected motion data from motion sensor 2 and preliminary filtering of its raw data. Based on the filtered data outputted from DAQ module 10, vessel motion prediction (VMP) module 12 is configured to compute a predicted subsequent motion of primary vessel A. Similarly, vessel motion prediction (VMP) module 13 is configured to compute a predicted subsequent motion of target vessel B based on the filtered data outputted from DAQ module 11. Prediction algorithms such as cosine similarity or vector similarity algorithms are known and may be employed in DAQ modules 12, 13. After that, all the predicted data (including motion and velocity) from the two channels is fed into computation module 14.

Figure 5:
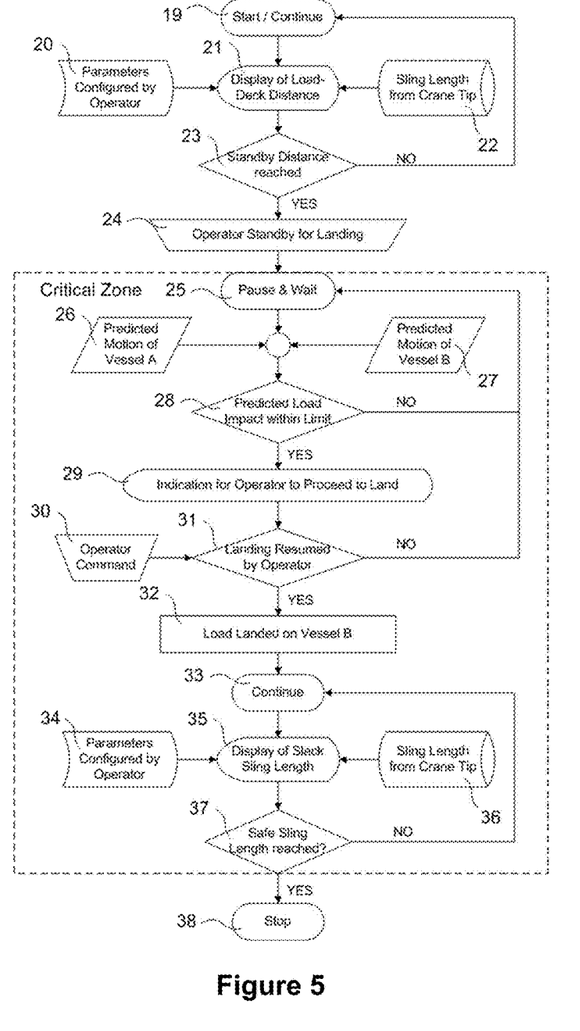
FIG. 5 is a flowchart illustrating a landing operation during cargo transfer.
Figure 6:
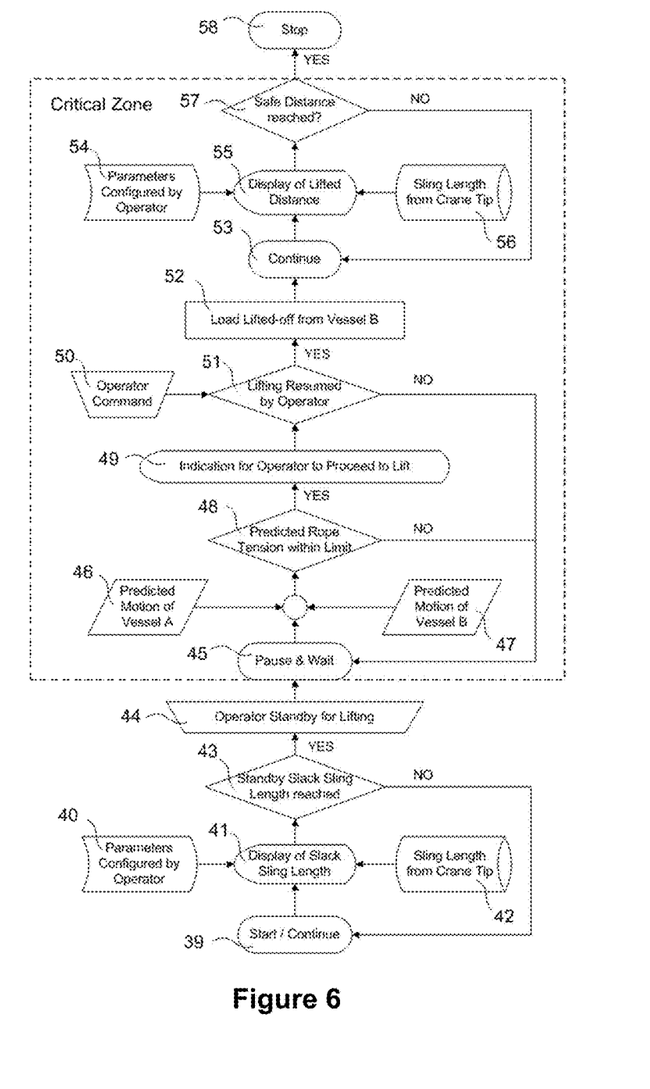
FIG. 6 is a flowchart illustrating a lifting operation during cargo transfer.

Computation module 14 includes a series steps illustrated by the flow charts in FIG. 5 and FIG. 6, and quickly prepares calculated results for logic and recommendation module 15 to make a decision. In addition to the predicted data from module 12 and 13, the computation module 14 is also configured to receive inputs from operator station 7 and onboard crane monitoring system 6. The operator station 7 comprises of an operator input module and a display panel 16. Parameters configured by operator 7 and used by computation module 14 include crane parameters such as crane tip height relative to crane base and crane line speed, and load parameters such as load weight and load dimension, and vessel parameters such as drafts of both vessels and vessel hull depth for both vessels. At the same time, computation module 14 is configured to obtain from the onboard crane monitoring system 6 the sling length from crane tip to the payload.

With the results produced by computation module 14, the logic and recommendation module 15 is able to perform comparison for rope tension and impact force on load with threshold limits defined at the Operator Station 7. Based on the comparison, a decision support recommendation is generated and sent to the display panel 16 where the parameters, curves and indication signals are visualized and updated in real-time.

During landing operation, while a load is descended towards the target vessel B using a crane located at the primary vessel A, the computation module 14 is configured to successively determine an instantaneous load-target distance between a load and the target vessel B; the logic and recommendation module 15 is configured to generate a pause signal which is to recommend pausing descent of the load if any of the instantaneous load-target distance is within a predetermined standby distance; the computation module 14 is configured to successively determine an instantaneous predicted impact on the load at landing time based on the predicted subsequent motion received from vessel motion prediction module(s) 12, 13; the logic and recommendation module 15 is configured to generate a resume-landing signal which is to recommend resuming descent of the load to land the load on the target vessel B, if any of the instantaneous predicted impact is within a predetermined load impact limit. The instantaneous load-target distance may be determined based on the instantaneous measured sling length and at least one of the prescribed parameters, e.g. load dimensions, crane line speed.

After the load is landed, the computation module 14 is further configured to detect the load is landed on the target vessel B, possibly by input from the operator station 7 or crane monitoring system 6, and successively determine an instantaneous slack sling length of the sling (i.e. instantaneous length of the slack sling) while the hoisting rope is paid out to increase slack in the sling; the logic and recommendation module 15 is further configured to generate a landing-completed signal which is to recommend ceasing paying out the hoisting rope, if any of the instantaneous slack sling length reaches at least a predetermined safe sling length. The instantaneous slack sling length may be determined based on the instantaneous measured sling length and at least one of the prescribed parameters.

During lifting operation, while the hoisting rope is retracted to reduce slack in the sling, the computation module 14 is configured to successively determine an instantaneous slack sling length of a sling attaching a load located on the target vessel B to a tip of a crane located on the primary vessel; the logic and recommendation module 15 is configured to generate a pause signal which recommends pausing raising of the sling if any of the instantaneous slack sling length is within a predetermined standby slack sling length; the computation module 14 is configured to successively determine an instantaneous predicted rope tension on the crane at lift-off time based on the predicted subsequent motion received from vessel motion prediction module(s) 12, 13; the logic and recommendation module 15 is configured to generate a resume-lifting signal which recommends resuming load lifting from the target vessel B, if any of the instantaneous predicted rope tension is within a predetermined safe rope tension limit. The slack sling length may be determined based on the measured sling length and at least one of the prescribed parameters e.g. load dimensions, crane line speed.

After the load is landed, the computation module 14 is further configured to detect the load is lifted from the target vessel B, possibly by input from the operator station 7 or crane monitoring system 6, and successively determine an instantaneous lifted distance between the load and the target vessel B while the hoisting rope is retracted to raise the load; the logic and recommendation module 15 is configured to generate a lifting-complete signal which is to recommend ceasing retracting the hoisting rope if any of the instantaneous lifted distance reaches at least a predetermined safe lifted distance. The instantaneous lifted distance may be determined based on the instantaneous measured sling length and at least one of the prescribed parameters.

Landing—Lowering the Load

Reference is now made to FIG. 5 illustrating a load landing operation on target vessel B (or "second body") using a crane located on primary vessel A ("or first body").

For transferring a load or payload from primary vessel A to target vessel B, the operator first lifts off the load from primary vessel A using a crane located at a deck 18*a* of primary vessel A, slews the crane, and holds or places the load above the target vessel B. Once the load is in position above vessel B for landing, the CTMS can be used or activated.

Prior to the load transfer operation, the operator configures the CTMS with prescribed input parameters, e.g. crane tip height relative to crane base, crane line speed, load weight, load dimensions, primary vessel A draft, primary vessel A hull depth, target vessel B draft, target vessel B hull depth. He checks the communication between the onboard crane monitoring system and CTMS is functioning.

Then as shown in FIG. 5, the operator initiates landing operation, pays out the hoisting rope of the crane and the load starts to descend (block 19). The sling is defined as the part of the hoisting rope between the crane tip and the load. Meanwhile, the crane monitoring system measures and sends the instantaneous measured sling length (block 22) to the CTMS. This sling length information is combined with at least one of the prescribed input parameters (block 20). Based on these parameters, the central data processing unit determines or ascertains an instantaneous vertical distance from the load bottom to the deck 18*b* of target vessel B or second body (hereinafter as "load-deck distance" or "load-target distance" as shown by label "d" in FIG. 1) and displays the ascertained instantaneous load-deck distance (block 21) to the operator.

While the load is descended towards the second body using the crane, the instantaneous load-deck distance is successively or continuously determined and compared with a predetermined standby distance (block 23), which is predefined in lifting operation standards or derived from the prescribed parameters. Before the instantaneous load-deck distance reaches the predetermined standby distance, the CTMS recommends operator to keep descending the load (block 19). Once the payload reaches the predetermined standby distance, i.e. the instantaneous load-deck distance is within the predetermined standby distance, the CTMS generates a pause signal which recommends the operator to stop the crane (block 24). The operator is recommended to pause the landing operation i.e. pause descent of the load, and wait (block 25) for a land recommendation indication before resuming landing.

As soon as predetermined standby distance is reached, critical zone of landing operation is entered. Operator waits for the CTMS to give him a land recommendation indication or resume-landing signal to proceed to land the payload. The CTMS generates this signal based on the criteria that the instantaneous resultant impact force on the payload and target vessel B at the instant of landing will be within a predefined limit. From the standby distance, the payload requires time to be lowered to the deck. Due to this time lag, the real-time vessel motion at that instant is not sufficient in aiding decision support. A vessel motion prediction method is introduced and the predicted vessel motion is used to determine or calculate the instantaneous expected landing impact force. When the payload is kept at the predetermined standby distance (block 25) from target vessel B, the predicted subsequent motion of vessel A (block 26) and the predicted subsequent motion of vessel B (block 27) are used to determine or calculate the instantaneous predicted load impact. The predicted load impact is successively or continuously compared with the pre-defined load impact limit (block 28). Once the predicted load impact is within this limit, an indication or resume-landing signal will be generated and provided to the operator to proceed to land (block 29). Otherwise, CTMS will recommend the operator to stay waiting. When the resume-landing recommendation indication (block 29) appears, the operator (block 30) may proceed to operate the crane to land the payload. The CTMS monitors the operator and checks whether he has decided to proceed with the landing of the payload (block 31). If the operator does not react to the signal and waits, the CTMS automatically returns to waiting status and continues to evaluate.

If the operator proceeds to land the payload, the load will land on target vessel B after a time period (block 32). After the load is landed on vessel B, the CTMS detects the load is landed and recommends the operator continue (block 33) to pay out the hoisting rope to increase slack in the sling to make sure the load will not be lifted up when the rigger on vessel B tries to disconnect the load from the sling. After the load is landed, the system uses the stored prescribed parameters (block 34) and instantaneous measured sling length (block 36) and determines or calculates the instantaneous slack sling length (i.e. instantaneous length of the slack sling) attached to the load and displays the instantaneous slack sling length (block 35) to the operator. The instantaneous slack sling length is successively or continuously determined and compared with the predetermined safe sling length (block 37), which is defined in lifting operation standards or derived from the prescribed parameters. Before instantaneous sling length reaches this value, the hoisting rope keeps being paid out (block 33). After the sling reaches the predetermined safe sling length, the operator is provided with a landing-completed signal which recommends ceasing or stopping paying out hoisting rope (block 38). The landing operation is completed.

In some embodiments, the load-deck distance is determined by measurement rather than by calculation based on measured sling length and prescribed input parameters as described above. Determination of the load-deck distance may be performed by a distance sensor located on the load or deck of the target vessel. In these and other embodiments, relative velocity and/or relative acceleration of the load e.g. bottom of the load, and the target vessel e.g. deck of the target vessel, are determined based on the determined load-deck distance, whether the load-deck distance is determined by measurement or by calculation.

Lifting—Hoisting the Load

Reference is now made to FIG. 6 illustrating lifting a load from target vessel B (or "second body") using a crane located on primary vessel A ("or first body").

Similar to load landing, prior to commencing the procedure of FIG. 6, the operator configures the system with the prescribed input parameters. He also checks the communication between the onboard crane monitoring system and the CTMS is functioning. Then as shown in FIG. 6, the operator initiates the lifting operation and the hoisting rope starts being pulled in or retracted (block 39). Meanwhile, the crane monitoring system measures an instantaneous length of the sling attaching the load to a tip of the crane and sends the instantaneous measured sling length (block 42) to the CTMS. This sling length information is combined with at least one of the prescribed input parameters, e.g. crane tip height relative to crane base, crane line speed, load weight, load dimensions, primary vessel A draft, primary vessel A hull depth, target vessel B draft, target vessel B hull depth (block 40). Based on these combined prescribed input parameters, the central data processing unit determines or ascertains an instantaneous slack sling length (i.e. instantaneous length of the slack sling) from the crane tip to the tie point of the payload and displays the determined instantaneous slack sling length (block 41) to the operator.

While the hoisting rope is being retracted to reduce slack in the sling, instantaneous slack sling length is successively or continuously determined and compared with the predetermined standby slack sling length (block 43), which is defined in lifting operation standards. Before the instantaneous slack sling length reaches the predetermined standby length, the hoisting rope keeps being pulled in or retracted to reduce slack in the sling (block 39). Once the instantaneous slack sling length reaches or is within the predetermined standby slack sling length, the CTMS generates a pause signal which recommends the operator to wait (block 44). The operator is recommended to pause the lifting operation and wait (block 45) for the lift recommendation indication before resuming lifting.

As soon as the predetermined standby slack sling length is reached, critical zone of lifting operation is entered. Operator waits for the CTMS to give him a lift recommendation indication or resume-lifting signal to proceed to lift the payload. The CTMS generates such signal based on the criteria that the instantaneous resultant rope tension on the crane at the instant of lifting-off will be within a predefined limit. From the standby slack sling length, the slacked rope requires time to reduce its length to zero at which time the load will be lifted off. Due to this time lag, the real-time vessel motion is not sufficient in aiding the decision support. A vessel motion prediction method is introduced and the predicted vessel motion is used to determine or calculate the instantaneous expected lifting rope tension. When the payload is kept static (block 45) relative to target vessel B, the predicted subsequent motion of vessel A (block 46) and the predicted subsequent motion of vessel B (block 47) are used to calculate the instantaneous predicted rope tension. The instantaneous predicted rope tension is successively or continuously calculated and compared with the predetermined rope tension limit (block 48). Once the instantaneous predicted rope tension is within this limit, an indication or resume-lifting signal will be provided to the operator to proceed to lift (block 49). Otherwise, the CTMS will recommend the operator to stay waiting. When the resume-lifting recommendation indication (block 49) appears, the operator (block 50) may proceed to operate the crane to lift the payload. The CTMS monitors the operator and checks whether he has decided to proceed with the lifting operation (block 51). If the operator does not react to the signal and waits, the CTMS automatically returns to waiting status and continues to evaluate.

If the operator proceeds to lift the payload, the load will be lifted off from vessel B after a time period (block 52). After the load is lifted off from vessel B, the CTMS detects the load is lifted and recommends the operator continue (block 53) retracting the hoisting rope to raise or hoist the load to reach a height where the load will not be re-hit by vessel B. After the load is lifted off, the system uses the stored operator prescribed input parameters (block 54) and sling length (block 56) and determines or calculates the instantaneous distance from the load bottom to the deck 18*b* of vessel B (hereinafter as "lifted distance") and displays the instantaneous lifted distance (block 55) to the operator. The instantaneous lifted distance is successively or continuously determined and compared with the predetermined safe lifted distance (block 57), which is defined in lifting operation standards or derived from the prescribed parameters. Before the instantaneous lifted distance reaches this value, the load keeps ascending (block 53). After the load reaches the safe lifted distance, the operator is signaled to stop (block 58) pulling in or retracting the hoisting rope. After that, the operator slews the crane, and lands the payload on the primary vessel A. The lifting operation is completed.

For landing and lifting operations, it is to be appreciated that in embodiments either the first or the second body is a fixed platform, e.g. in FIG. 2(*b*) and FIG. 2(*c*), prediction of vessel motion is performed only for the floating body.

It is to be understood that the embodiments and features described above should be considered exemplary and not restrictive. For example, the above-described embodiments may be used in combination with each other. Many other embodiments will be apparent to those skilled in the art from consideration of the specification and practice of the invention. The scope of the invention should, therefore, be determined with reference to the appended claims, along with the full scope of equivalents to which such claims are entitled. Furthermore, certain terminology has been used for the purposes of descriptive clarity, and not to limit the disclosed embodiments of the invention.

The invention claimed is:

1. A method for guiding load landing during load transfer from a first body to a second body, the method comprising:
   successively determining a load-target distance between a load and the second body while the load is descended towards the second body using a crane located at the first body;
   if any of the load-target distance is within a predetermined standby distance, generating a pause signal which recommends pausing descent of the load;
   determining a predicted subsequent motion of at least one of the first and the second body;
   successively determining a predicted impact on the load at landing time based on the predicted subsequent motion; and
   if any of the predicted impact is within a predetermined load impact limit, generating a resume-landing signal which recommends resuming descent of the load to land the load on the second body.

2. The method of claim 1, wherein successively determining a load-target distance between a load and the second body includes:
   successively determining the load-target distance between the load and the second body based on a measured sling length of a sling attaching the load to a tip of the crane and at least one parameter selected from the group consisting of: crane tip height relative to crane base and crane base, crane line speed, load weight, load dimensions, the first body draft, the first body hull depth, the second body draft, and the second body hull depth.

3. The method of claim 2, wherein determining a predicted subsequent motion of at least one of the first and the second body includes:
   receiving detected motion data of at least one of the first and the second body; and
   determining the predicted subsequent motion based on the detected motion data.

4. The method of claim 3, further comprising:
   detecting the load is landed on the second body;
   successively determining a slack sling length of the sling while a hoisting rope is paid out to increase slack in the sling; and
   if any of the slack sling length reaches at least a predetermined safe sling length, generating a landing-completed signal which recommends ceasing paying out the hoisting rope.

5. The method of claim 4, wherein successively determining a slack sling length of the sling includes:
   successively determining the slack sling length of the sling based on the measured sling length of the sling and one parameter selected from the group consisting of: crane tip height relative to crane base, crane line speed, load weight, load dimensions, the first body draft, the first body hull depth, the second body draft, and the second body hull depth.

6. The method of claim 1, wherein at least one of the first and the second body is a floating vessel.

7. A system for guiding load transfer from a first body to a second body, the system comprising:
   at least one motion sensor located on at least one of the first and the second body, which is a floating vessel, for detecting respective body motion;
   a data processing unit comprising:
      at least one motion data acquisition module for receiving the detected motion data from the at least one motion sensor;
      at least one vessel motion prediction module communicably coupled to the at least one motion data acquisition module and configured to determine a predicted subsequent motion of the at least one of the first and the second body based on the detected motion data;
      a computation module communicably coupled to the at least one vessel motion prediction module and configured to:
         successively determine a load-target distance between a load and the second body while the load is descended towards the second body using a crane located at the first body; and
      a logic and recommendation module communicably coupled to the computation module and configured to:
         if any of the load-target distance is within a predetermined standby distance, generate a pause signal which is to recommend pausing descent of the load; and
   wherein the computation module is further configured to:
      successively determine a predicted impact on the load at landing time based on the predicted subsequent motion; and
   wherein the logic and recommendation module is further configured to: if any of the predicted impact is within a predetermined load impact limit, generate a resume-landing signal which is to recommend resuming descent of the load to land the load on the second body.

8. The system of claim 7, wherein the computation module is further configured to:
   successively determine the load-target distance between the load and the second body based on a measured sling length of a sling attaching the load to a tip of the crane and at least one parameter selected from the group consisting of: crane tip height relative to crane base, crane line speed, load weight, load dimensions, the first body draft, the first body hull depth, the second body draft, and the second body hull depth.

9. The system of claim 8, wherein the computation module is further configured to:
   detect the load is landed on the second body; and successively determine a slack sling length of the sling while a hoisting rope is paid out to increase slack in the sling, and wherein the logic and recommendation module is further configured to:
if any of the slack sling length reaches at least a predetermined safe sling length, generate a landing-completed signal which is to recommend ceasing paying out the hoisting rope.

10. The system of claim 9, wherein the computation module is further configured to:
successively determine the slack sling length of the sling based on the measured sling length of the sling and one parameter selected from the group consisting of: crane tip height relative to crane base, crane line speed, load weight, load dimensions, the first body draft, the first body hull depth, the second body draft, and the second body hull depth.

11. A method for guiding load lifting during load transfer from a second body to a first body, the method comprising:
successively determining a slack sling length of a sling attaching a load located on the second body to a tip of a crane located on the first body while the sling is raised by a hoisting rope to reduce slack in the sling;
if any of the slack sling length is within a predetermined standby slack sling length, generating a pause signal which recommends pausing raising of the sling;
determining a predicted subsequent motion of at least one of the first and the second body;
successively determining a predicted rope tension on the crane at lift-off time based on the predicted subsequent motion; and
if any of the predicted rope tension is within a predetermined safe rope tension limit, generating a resume-lifting signal which recommends resuming load lifting from the second body.

12. The method of claim 11, successively determining a slack sling length of a sling attaching a load located on the second body to a tip of a crane located on the first body includes:
successively determining the slack sling length of the sling attaching the load located on the second body to the tip of the crane located on the first body based on a measured sling length of the sling attaching the load to a tip of the crane at least one parameter selected from the group consisting of: relative height between crane tip and crane base, crane line speed, load weight, the first body draft, the first body hull depth, the second body draft, and the second body hull depth.

13. The method of claim 12, wherein determining a predicted subsequent motion of at least one of the first and the second body includes:
receiving detected motion data of at least one of the first and the second body; and
determining the predicted subsequent motion based on the detected motion data.

14. The method of claim 13, further comprising:
detecting the load is lifted from the second body;
successively determining a lifted distance between the load and the second body while the hoisting rope is retracted to raise the load;
if any of the lifted distance reaches at least a predetermined safe lifted distance, generating a lifting-complete signal which recommends ceasing retracting the hoisting rope.

15. The method of claim 14, wherein successively determining a lifted distance between the load and the second body includes:
successively determining the lifted distance between the load and the second body based on the measured sling length of the sling and at least one parameter selected from the group consisting of: relative height between crane tip and crane base, crane line speed, load weight, the first body draft, the first body hull depth, the second body draft, and the second body hull depth.

16. The method of claim 11, wherein at least one of the first and the second body is a floating vessel.

17. A system for guiding load transfer from a second body to a first body, the system comprising:
at least one motion sensor located on at least one of the first and the second body, which is a floating vessel, for detecting respective body motion;
a data processing unit comprising:
at least one motion data acquisition module for receiving detected motion data from the at least one motion sensor;
at least one vessel motion prediction module communicably coupled to the at least one motion data acquisition module and configured to determine a predicted subsequent motion of the at least one of the first and the second body based on the detected motion data;
a computation module communicably coupled to the at least one vessel motion prediction module, and configured to:
successively determine a slack sling length of a sling attaching a load located on the second body to a tip of a crane located on the first body while the hoisting rope is being retracted to reduce slack in the sling; and
a logic and recommendation module communicably coupled to the computation module and configured to:
if any of the slack sling length is within a predetermined standby slack sling length, generate a pause signal which recommends pausing raising of the sling; and
wherein the computation module is further configured to:
successively determine a predicted rope tension on the crane at lift-off time based on the predicted subsequent motion; and
wherein the logic and recommendation module is further configured to: if any of the predicted rope tension is within a predetermined safe rope tension limit, generate a resume-lifting signal which recommends resuming load lifting from the second body.

18. The system of claim 17, wherein the computation module is further configured to:
successively determine the slack sling length of the sling attaching the load located on the second body to the tip of the crane located on the first body based on a measured sling length of the sling attaching the load to a tip of the crane at least one parameter selected from the group consisting of: relative height between crane tip and crane base, crane line speed, load weight, the first body draft, the first body hull depth, the second body draft, and the second body hull depth.

19. The system of claim 18, wherein the computation module is further configured to:

detect the load is lifted from the second body; and
successively determine a lifted distance between the load and the second body while the hoisting rope is retracted to raise the load, and wherein the logic and recommendation module is further configured to:
if any of the lifted distance reaches at least a predetermined safe lifted distance, generate a lifting-complete signal which is to recommend ceasing retracting the hoisting rope.

20. The system of claim 19, wherein the computation module is further configured to:
successively determine the lifted distance between the load and the second body based on the measured sling length and at least one parameter selected from the group consisting of: relative height between crane tip and crane base, crane line speed, load weight, the first body draft, the first body hull depth, the second body draft, and the second body hull depth.

* * * * *